United States Patent [19]
Tseytlin et al.

[11] Patent Number: 5,762,124
[45] Date of Patent: Jun. 9, 1998

[54] COMPACT COLLAPSIBLE SUNSHADE

[76] Inventors: Alexander A. Tseytlin, 2821 La Jolla Ave., San Jose, Calif. 95124; Julia A. Brisker, 4320 Sayoko Circuit, San Jose, Calif. 95136

[21] Appl. No.: 821,423

[22] Filed: Mar. 21, 1997

[51] Int. Cl.$^6$ ............................................. B60J 3/00
[52] U.S. Cl. ........................... 160/370.23; 296/97.7
[58] Field of Search ................. 160/370.23, 370.21, 160/84.04, 89, 237, 127, DIG. 2, DIG. 3, DIG. 7; 296/97.7, 97.8

[56] References Cited

U.S. PATENT DOCUMENTS

| | | | |
|---|---|---|---|
| 4,202,396 | 5/1980 | Levy | 160/370.23 X |
| 4,606,572 | 8/1986 | Maguire | 296/95 |
| 4,652,039 | 3/1987 | Richards | 160/370.23 X |
| 4,671,334 | 6/1987 | Yadegar et al. | 160/84.04 |
| 4,758,042 | 7/1988 | Liu | 296/97 |
| 4,777,994 | 10/1988 | Nederveld | 160/84.04 |
| 4,805,955 | 2/1989 | Levy | 160/84 |
| 4,815,784 | 3/1989 | Zheng | 296/97.7 |
| 4,848,825 | 7/1989 | Niernberger | 160/370.23 X |
| 4,862,943 | 9/1989 | Shafia | 160/370.21 |
| 4,877,074 | 10/1989 | Castellano | 160/370.23 X |
| 4,878,708 | 11/1989 | Champane | 160/370.23 X |
| 4,913,211 | 4/1990 | Eskandry et al. | 160/370.23 X |
| 5,004,285 | 4/1991 | Bennett | 160/370.23 X |
| 5,165,748 | 11/1992 | O'Connor | 160/370.23 X |

*Primary Examiner*—David M. Purol
*Attorney, Agent, or Firm*—Jack Lo

[57] ABSTRACT

A collapsible sunshade includes a sheet with a central horizontal fold line dividing it into upper and lower portions, and vertical fold lines forming accordion pleats. In a first embodiment, the upper portion includes a large cutout spanned by a flexible material. In a second embodiment, the center of the upper portion includes an inverted T-shaped cut that follows the fold lines. The cutout and the T-shaped cut further divide the upper portion into left and right portions. The sunshade is compacted by collapsing the sheet inwardly horizontally, and folding the left and right portions outwardly and downwardly. The flexible material of the first embodiment and the T-shaped cut of the second embodiment enable the left and right upper portions to be folded against the lower portion. A pair of wings extending from the left and right portions serve as handles to facilitate opening, installation, removal, and folding of the sunshade. Triangular cutouts arranged along the lower edge of the sunshade and in registration with alternate fold lines enable the lower edge of the sunshade to be positioned close to the base of a windshield during folding and unfolding.

14 Claims, 3 Drawing Sheets

5,762,124

1

COMPACT COLLAPSIBLE SUNSHADE

BACKGROUND OF THE INVENTION

1. Field Of The Invention

This invention relates generally to sunshades for motor vehicle windows, specifically to a sunshade foldable into compact dimensions.

2. Prior Art

Sunshades are commonly placed under the windshields, side, or rear windows of motor vehicles for blocking out sunlight, so as to keep the interior cooler, and to protect the interior surfaces from solar damage. A typical sunshield is shown in U.S. Pat. No. 4,805,955 to Levy. It comprises a large sheet of cardboard about the size of a windshield. It is installed by positioning its lower edge between the bottom of the windshield and the top of the dashboard, and the top edge between the top of the windshield and the lowered sun visors. It is scored along spaced apart vertical lines and formed into a plurality of accordion pleats, so that it is collapsible for storage. A similar sunshade is shown in U.S. Pat. No. 4,758,042 to Liu, which comprises a sheet pleated to fold along horizontal lines. A sunshade shown in U.S. Pat. No. 4,815,784 to Zheng, which comprises a fabric covering flexible loops. Another type of sunshade includes fan-like blades, shown in U.S. Pat. No. 4,606,572 to Maguire.

Although prior art sunshades are collapsible, they are generally reduced in only one dimension after being collapsed. For example, the Levy sunshade is reducible in width, but not in height, and the Liu sunshade is reducible in height, but not in width. Therefore, even after collapsing, prior art sunshades are still at least about two feet long—the height of most automobile windshields—so that they are awkward to maneuver within the vehicle when being stowed. They are usually inconveniently placed on the floor or a seat, because they are too long to fit into a glove compartment. Furthermore, they are typically made of a stiff material, so that they often knock the rearview mirror out of position when being installed or removed. The Zheng and Maguire sunshades are both awkward to use, and the Maguire sunshade is expensive to manufacture.

OBJECTS OF THE INVENTION

Accordingly the primary object of the present invention is to provide a compact, collapsible sunshade that can be collapsed into a more compact size for convenient handling and storage.

Another object of the present invention is to provide a sunshade that is easy to open and collapse.

Yet another object of the present invention is to provide a sunshade that protects the rearview mirror from being knocked out of position.

Still another object of the present invention is to provide a sunshade that is economical to manufacture.

Further objects of the present invention will become apparent from a consideration of the drawings and ensuing description.

BRIEF SUMMARY OF THE INVENTION

A collapsible sunshade includes an accordion sheet with regularly spaced apart vertical fold lines. The sheet also includes a horizontal fold line that divides the sheet into upper and lower portions. In one embodiment, the upper portion includes a large central cutout which is spanned by a flexible material. In another embodiment, the center of the upper portion includes an inverted T-shaped cut that follows the fold lines. The cutout and the T-shaped cut further divide the upper portion into left and right portions.

The sunshade is compacted by collapsing the sheet in a horizontal direction, and folding the left and right portions downwardly. The flexible material of the former embodiment and the T-shaped cut of the latter embodiment both enable the left and right upper portions to be folded against the lower portion. A pair of wings extending from the left and right portions facilitate opening, installation, removal, and folding of the sunshade. Triangular cutouts arranged along the lower edge of the sunshade and in registration with the fold lines enable the lower edge of the sunshade to be positioned close to the base of a windshield during installation.

DRAWING REFERENCE NUMERALS

| | |
|---|---|
| 10. Sheet | 11. Horizontal Upper Edge |
| 12. Horizontal Lower Edge | 13. Vertical Side Edge |
| 14. Vertical Side Edge | 15. Central Vertical Fold Line |
| 16. Central Horizontal Fold Line | 17. Vertical Fold Lines |
| 18. Central Cutout | 19. Flexible Material |
| 20. Triangular Cutouts | 21. Flexible Materials |
| 22. Wings | 23. Elastic Loop |
| 24. Vehicle | 25. Windshield |
| 26. Dashboard | 27. Rearview Mirror |
| 28. Sun Visors | 29. Left Portion |
| 30. Right Portion | 40. Sheet |
| 41. Upper Horizontal Edge | 42. Lower Horizontal Edge |
| 43. Vertical Side Edge | 44. Vertical Side Edge |
| 45. Central Vertical Fold Line | 46. Central Horizontal Fold Line |
| 47. Vertical Fold Lines | 48. Rear View Mirror Cutout |
| 49. Central Vertical Cut | 50. Left Portion |
| 51. Right Portion | 52. Central Horizontal Cut |
| 53. Flexible Joining Strips | 54. Wings |
| 55. Elastic Loop | 56. Eyelets |
| 57. Triangular Cutouts | |

DETAILED DESCRIPTION OF THE INVENTION

Figure 1:
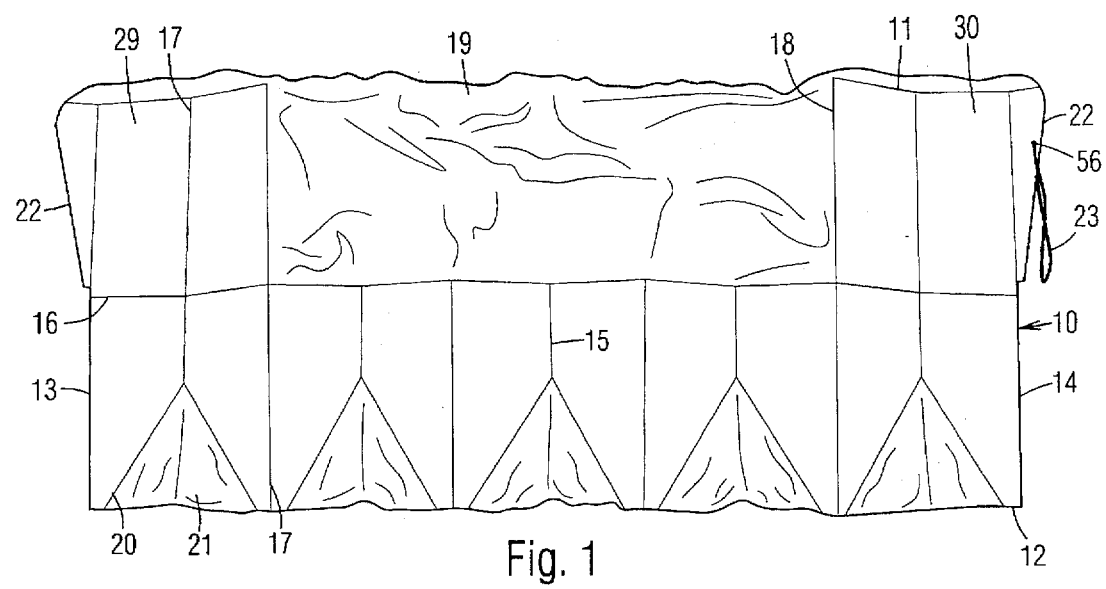
FIG. 1 is a front view of a collapsible sunshade in accordance with a first embodiment of the invention.

FIG. 1:

In accordance with a first embodiment of the invention shown in the front view of FIG. 1, a sunshade includes a generally rectangular accordion sheet 10 made of an inexpensive material which is sufficiently rigid to retain its shape when the sunshade is folded or unfolded. Such material may be corrugated cardboard, foam-lined material, plastic, paper, etc. Sheet 10 includes a horizontal upper edge 11, a horizontal lower edge 12, and vertical side edges 13 and 14. Sheet 10 also includes a central vertical fold line 15, and a central horizontal fold line 16. Evenly spaced, additional vertical fold lines 17 are arranged on sheet 10 to either side of central vertical fold line 15.

A central cutout 18 in sheet 10 extends between upper edge 11 and central horizontal fold line 16, and between two vertical fold lines 17, so that left and rigid portions 29 and 30 are defined on either side of cutout 18. Cutout 18 has a width at least twice as great as its height. An opaque flexible material 19, such as a fabric, extends across cutout 18. Preferably, flexible material 19 is a fabric with a reflective coating for reflecting sunlight, and also covers the entire surface of sheet 10. Triangular cutouts 20 extend upwardly into sheet 10 from lower edge 12, and are aligned with every other vertical fold line 17. Cutouts 20 facilitate sunshade installation and folding, as discussed in conjunction with FIG. 4. Opaque flexible materials 21 extend across triangular cutouts 20. A pair of foldable wings 22 extend from vertical side edges 13 and 14. An elastic loop 23 is attached to one of wings 22 through an eyelet 56.

Figure 2:
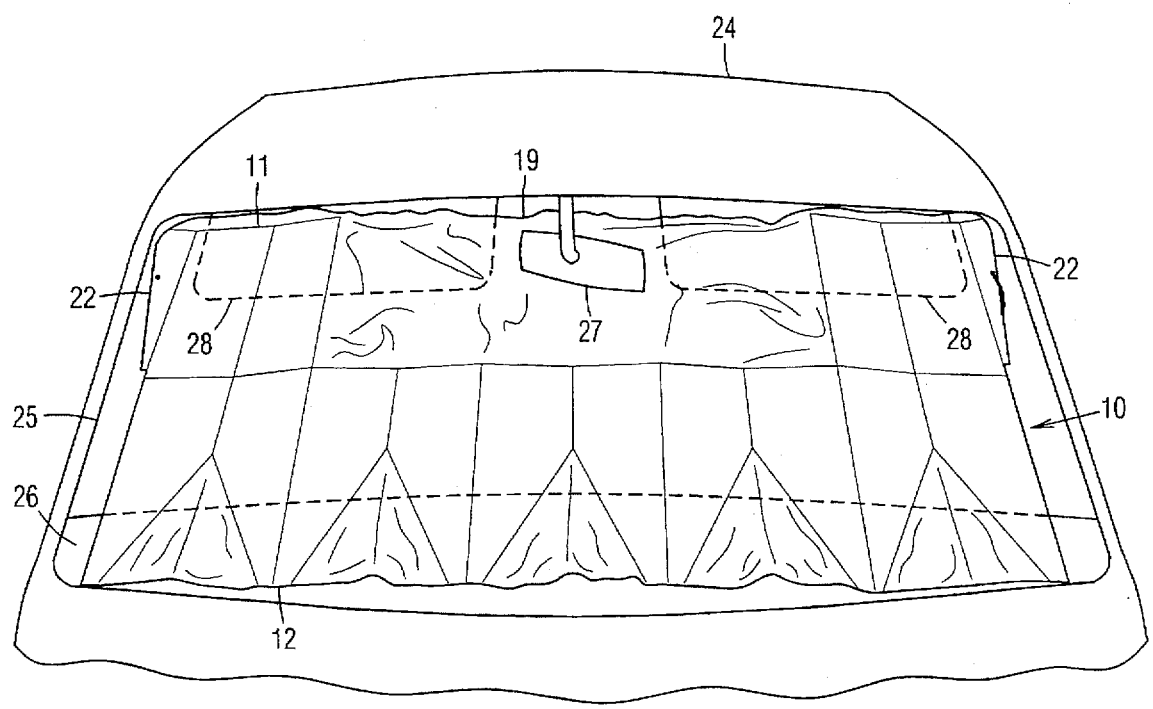
FIG. 2 is a front view of the sunshade of FIG. 1 installed under a windshield.

FIG. 2:

The sunshade is shown installed in a vehicle 24 in FIG. 2. Sheet 10 is sized to substantially cover the entire area of a windshield 25. The bottom of sheet 10 is positioned between the bottom of windshield 25 and the top of a dashboard 26, and the top is positioned between a rearview mirror 27 and sun visors 28, which are folded toward windshield 25 to hold the top of sheet 10 in position. Wings 22 serve as hand grips for convenient handling during sunshade installation. When the sunshade is being installed or removed, flexible material 19 blocks the sun and protects mirror 27 from being knocked out of position.

Figure 3:
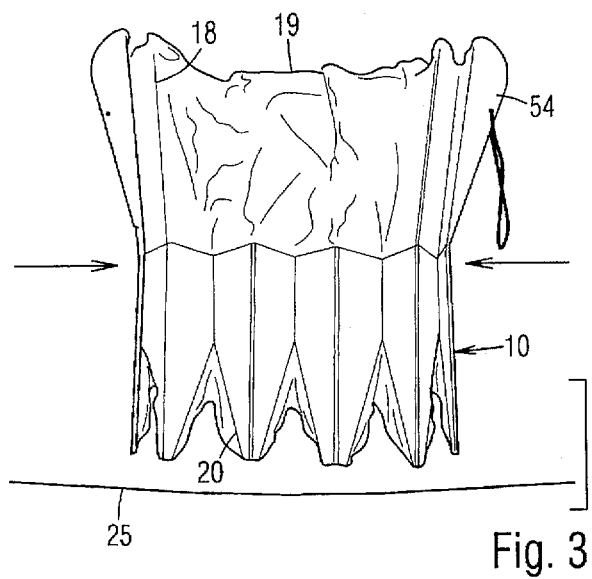
FIG. 3 is a front view of the sunshade of FIG. 1 being folded.
Figure 4:
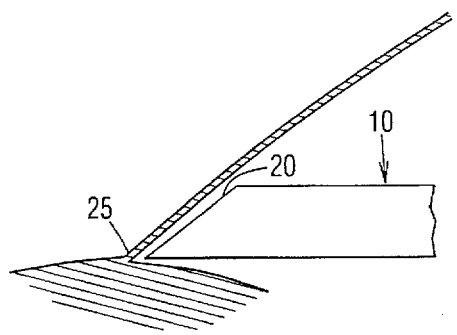
FIG. 4 is a side view of the sunshade of FIG. 1 being folded.
Figure 5:
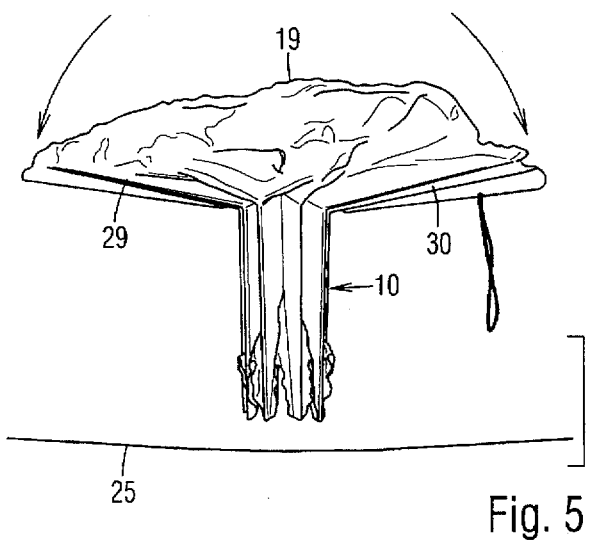
FIG. 5 is a front view of the sunshade of FIG. 1 being folded.
Figure 6:
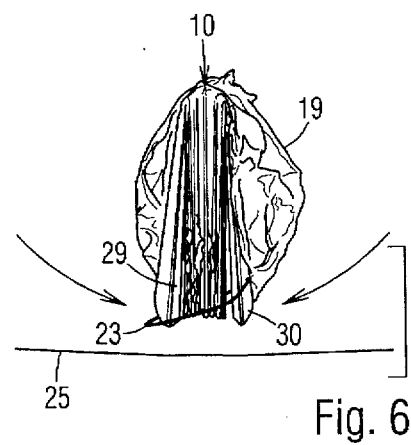
FIG. 6 is a front view of the sunshade of FIG. 1 being folded.

FIGS. 3–6:

When not in use, the sunshade may be compacted for storage by collapsing accordion sheet 10 in a horizontal direction, as shown in FIG. 3. As shown in FIG. 4, triangular cutouts 20 form a bevel when sheet 10 is being collapsed, so that sheet 10 is maintained close to the bottom edge of windshield 25. Next, left and right portions 29 and 30 are folded downwardly, as shown in FIGS. 5 and 6. Cutout 18 enables left and right portions 29 and 30 to be easily folded down in opposite directions. Cutout 18 also reduces the number of pleats on portions 29 and 30 to two to make folding easier. Alternatively, portions 29 and 30 may have more or fewer pleats. Flexible material 19 is wide enough to remain slightly loose even when left and right portion 29 and 30 are fully folded. The sunshade is kept in the folded condition with elastic loop 23.

Thus the present sunshade is compacted to half its height, so that it is compact enough to fit into an average glove compartment. The sunshade is easily unfolded and installed by releasing loop 23, and reversing the folding procedure. During manufacturing, the sunshade is folded as shown to set the folds in predetermined directions, so that it will easily follow the same folding pattern during use.

Figure 7:
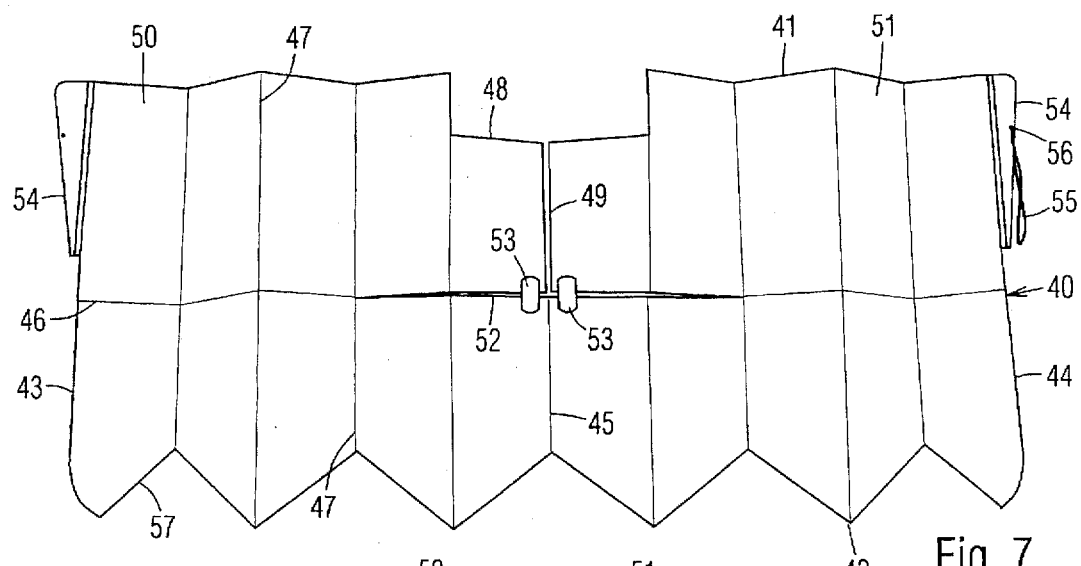
FIG. 7 is a front view of a collapsible sunshade in accordance with a second embodiment of the invention.

FIG. 7:

In accordance with a second embodiment of the invention shown in the front view of FIG. 7, a sunshade includes a sheet 40 made of an inexpensive material, which is sufficiently rigid to retain its shape when the sunshade is folded or unfolded. Such material may be corrugated cardboard, foam-lined material, plastic, paper, etc. Sheet 40 includes a horizontal upper edge 41, a horizontal lower edge 42, and vertical side edges 43 and 44. Sheet 40 also includes a central vertical fold line 45, and a central horizontal fold line 46. Evenly spaced, additional vertical fold lines 47 are arranged on sheet 40 to either side of central vertical fold line 45, and extend between upper edge 41 and lower edge 42. Triangular cutouts 57 extend upwardly into sheet 40 from lower edge 42, and are aligned with every other vertical fold line 47. Cutouts 57 facilitate sunshade installation and folding in the same manner shown in FIG. 4. Alternatively, cutouts 57 may be provided with opaque flexible materials for blocking the sun.

A rearview mirror cutout 48 extends downwardly from upper edge 41 partially into sheet 10 for providing clearance around the rear view mirror (not shown), so as not to knock the mirror out of position. A central vertical cut 49 extends between upper edge 41 and central horizontal fold line 46, so that left and right portions 50 and 51 are defined on either of vertical cut 49. A horizontal cut 52 extends along horizontal fold line 46, and is symmetrically positioned with respect to vertical cut 49. A pair of flexible joining strips 53, such as fabric tape, span horizontal cut 52 on both sides of vertical cut 49 to keep portions 50 and 51 above cut 52 connected to the portion below thereof, so they would not fall away and create a large opening. A pair of foldable wings 54 extend from vertical side edges 43 and 44. An elastic loop 55 is attached to one of wings 54 through an eyelet 56. The installation and folding procedures of sheet 40 in a vehicle is the same as that of sheet 10 (FIG. 1).

Figure 8:
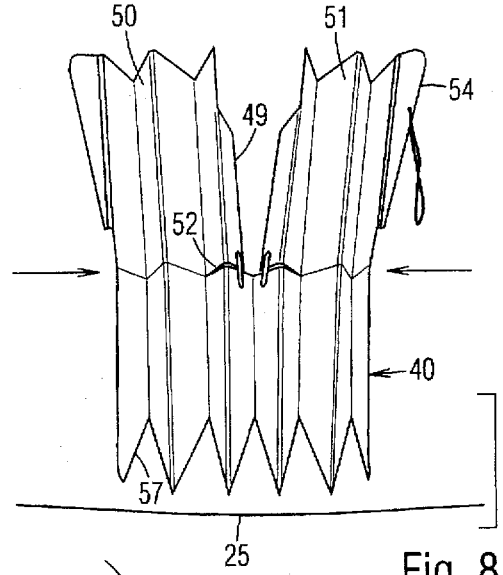
FIG. 8 is a front view of the sunshade of FIG. 7 being folded.
Figure 9:
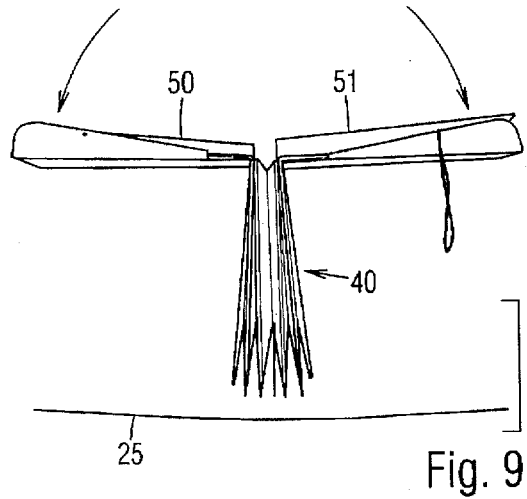
FIG. 9 is a front view of the sunshade of FIG. 7 being folded.
Figure 10:
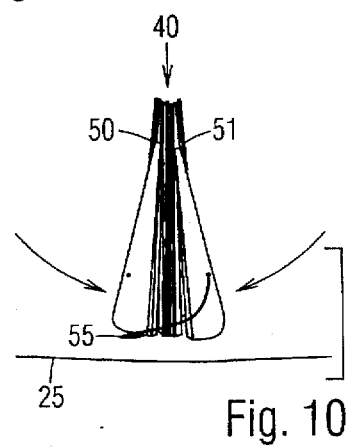
FIG. 10 is a front view of the sunshade of FIG. 7 being folded.

FIGS. 8–10:

When not in use, the sunshade may be compacted for storage by collapsing accordion sheet 40 in a horizontal direction, as shown in FIG. 8. Triangular cutouts 57 form a bevel similar to that shown in FIG. 4 during folding to allow sheet 40 to be positioned close to the base of windshield 25. Next, left and right portions 50 and 51 are folded downwardly, as shown in FIGS. 9 and 10. Vertical cut 49 enables left and right portions 50 and 51 to be folded in opposite directions. In this example, five pleats are formed on each portion 50 and 51. Horizontal cut 52 reduces the number of pleats being bent during folding from five to three to make folding easier. Alternatively, horizontal cut 52 may be lengthened to further reduce the number of pleats being folded. The sunshade is kept in the folded condition with elastic loop 55.

SUMMARY AND SCOPE

Accordingly, we have provided a sunshade that can be collapsed into a compact size for convenient handling and storage. It is easy to open and collapse. It protects the rearview mirror from being knocked out of position, and it is economical to manufacture.

Although the above descriptions are specific, they should not be considered as limitations on the scope of the invention, but only as examples of the embodiments. Many substitutes and variations are possible within the teachings of the invention. For example, instead of having a flexible material spanning the entire surface of accordion sheet 10, separate flexible materials may span only the cutouts to reduce material cost. Instead of cardboard, sheet 10 may be made of plastic, or any other substantially rigid but foldable material. Part of all of sheet 10 may be comprised of separate panels inserted into pockets in a flexible material. Additional triangular panels may be arranged on the inner edges of cutout 18. The cutout may be considered as a cut. The upper and lower portions may be of different heights. The cutout and the central vertical cut may be arranged on the lower portion of the sheet instead of the upper portion, i.e., the sheet may be simply inverted. The sunshade may be made of other materials, and has other proportions. The flexible material may be attached to both sides of the rigid sheet. The elastic band may be attached to the side edge of the sheet instead of a wing. The sunshade may be installed under the rear window by attaching hooks to the side edges of the window by suction cups or other means, and connecting the hooks to the eyelets. The sunshade may be attached to a side window by pinching it between the window and the window frame. Therefore, the scope of the invention should be determined by the appended claims and their legal equivalents, not by the examples given.

We claim:

1. A collapsible sunshade, comprising:

a sheet having an upper edge, a lower edge, and opposite sides;

a horizontal fold line arranged on said sheet dividing said sheet into upper and lower halves;

a plurality of vertical fold lines arranged on said sheet at regular intervals forming accordion pleats foldable in alternating directions, one of said vertical fold lines being a central vertical fold line;

a vertical cut arranged on one of said halves of said sheet and aligned along said central vertical fold line, said vertical cut separating said one of said halves of said sheet into a left portion and a right portion; and a horizontal cut arranged along said horizontal fold line and centered about said vertical cut, said horizontal cut and said vertical cut cooperating to form a T-shaped cut;

said sheet being collapsible by compacting said accordion pleats inwardly horizontally, and folding said left portion and said right portion outwardly in opposite directions, said horizontal cut reducing a number of layers of said accordion pleats being bent during folding and making folding easier.

2. The collapsible sunshade of claim 1, further including a flexible material spanning said vertical cut.

3. The collapsible sunshade of claim 1, further including flexible joining means spanning said horizontal cut for flexibly joining said upper and lower halves of said sheet above and below said horizontal cut.

4. The collapsible sunshade of claim 1, further including a plurality of triangular cutouts extending into said sheet from said lower edge thereof, said triangular cutouts being aligned with alternate vertical fold lines.

5. The collapsible sunshade of claim 1, further including a pair of wings extending from said opposite sides of said sheet for being grasped.

6. The collapsible sunshade of claim 1, further including a rearview mirror cutout extending downwardly from said upper edge of said sheet for providing clearance around a vehicle rearview mirror.

7. The collapsible sunshade of claim 1, further including an elastic band attached to one of said opposite sides for binding said sunshade in a collapsed condition.

8. A collapsible sunshade, comprising:

a sheet having upper and lower horizontal edges, and opposite vertical sides;

a horizontal fold line arranged on said sheet dividing said sheet into upper and lower halves;

a plurality of vertical fold lines arranged on said sheet at regular intervals forming accordion pleats foldable in alternating directions, one of said vertical fold lines being a central vertical fold line;

a cutout arranged on one of said halves of said sheet, said cutout extending vertically between one of said horizontal edges of said sheet to said horizontal fold line, said cutout extending horizontally partially toward said opposite vertical sides of said sheet, said cutout separating said one of said halves of said sheet into a left portion and a right portion; and a flexible material spanning said cutout;

said sheet being collapsible by compacting said accordion pleats inwardly horizontally, and folding said left portion and said right portion outwardly in opposite directions.

9. The collapsible sunshade of claim 8, further including a flexible material spanning said vertical cut.

10. The collapsible sunshade of claim 8, further including a plurality of triangular cutouts extending into said sheet from the lower horizontal edge thereof, said triangular cutouts being aligned with alternate vertical fold lines.

11. The collapsible sunshade of claim 10, further including a flexible material spanning each of said triangular cutouts.

12. The collapsible sunshade of claim 8, further including a pair of wings extending from said opposite vertical sides of said sheet for being grasped.

13. The collapsible sunshade of claim 8, further including a rearview mirror cutout extending downwardly from the upper horizontal edge of said sheet for providing clearance around a vehicle rearview mirror.

14. The collapsible sunshade of claim 8, further including an elastic band attached to one of said opposite vertical sides for binding said sunshade in a collapsed condition.

* * * * *